(12) United States Patent
Rollwa et al.

(10) Patent No.: US 11,937,562 B2
(45) Date of Patent: Mar. 26, 2024

(54) GREENHOUSE SYSTEM

(71) Applicant: Jungheinrich Aktiengesellschaft, Hamburg (DE)

(72) Inventors: Volker Rollwa, Pirmasens (DE); Jörg Cavelius, Bad Villbel (DE); Markus Liebhaber, Oberursel (DE)

(73) Assignee: JUNGHEINRICH AKTIENGESELLSCHAFT, Hamburg (DE)

( * ) Notice: Subject to any disclaimer, the term of this patent is extended or adjusted under 35 U.S.C. 154(b) by 0 days.

(21) Appl. No.: 17/703,405

(22) Filed: Mar. 24, 2022

(65) Prior Publication Data

US 2022/0304250 A1 Sep. 29, 2022

(30) Foreign Application Priority Data

Mar. 25, 2021 (EP) .................................... 21164921

(51) Int. Cl.
*A01G 9/029* (2018.01)
*A01G 9/08* (2006.01)
(Continued)

(52) U.S. Cl.
CPC ............ *A01G 9/0299* (2018.02); *A01G 9/088* (2013.01); *A01G 9/14* (2013.01); *A01G 9/249* (2019.05)

(58) Field of Classification Search
CPC .......... A01G 9/14; A01G 9/088; A01G 9/249; A01G 9/0299
See application file for complete search history.

(56) References Cited

U.S. PATENT DOCUMENTS 9,592,759 B1 * 3/2017 Theobald .............. B65G 1/0492
9,785,911 B2 * 10/2017 Galluzzo .................. B25J 5/007
(Continued)

FOREIGN PATENT DOCUMENTS

DE 102011050545 B3 11/2012
GB 2 130 555 A 6/1984
(Continued)

OTHER PUBLICATIONS

Search Report dated Sep. 10, 2021 from counterpart European patent application No. 21164921.5-1005.

*Primary Examiner* — Monica L Perry
*Assistant Examiner* — Aaron M Rodziwicz
(74) *Attorney, Agent, or Firm* — GREENBLUM & BERNSTEIN, P.L.C.

(57) ABSTRACT

A method for operating a greenhouse system with block storage, at least one block storage container and at least one vehicle. Each block storage container has a carrier frame and a plant receptacle, the plant receptacle being detachably engaged with the carrier frame, the block storage having at least one first zone and one second zone, and at least one first carrier frame and at least one second carrier frame, the plant receptacle in the first zone being detachably engaged with the first carrier frame; and the plant receptacle being subsequently transferred into the second zone, the plant receptacle being transferred from the first carrier frame to the second carrier frame as part of the transferal from the first zone into the second zone, the plant receptacle in the second zone being detachably engaged with the second carrier frame.

15 Claims, 3 Drawing Sheets

(51) Int. Cl.
*A01G 9/14* (2006.01)
*A01G 9/24* (2006.01)

(56) References Cited

U.S. PATENT DOCUMENTS

| | | | |
|---|---|---|---|
| 10,201,122 B2* | 2/2019 | Higgins | A01G 31/02 |
| 10,407,243 B1* | 9/2019 | Prout | B65G 1/1373 |
| 11,533,858 B2* | 12/2022 | Laeske | A01G 9/143 |
| 11,582,919 B2* | 2/2023 | van Staalduinen | A01G 31/042 |
| 11,596,109 B2* | 3/2023 | Fonseca dos Reis | A01G 27/003 |
| 2017/0339846 A1* | 11/2017 | Lawrence | A01G 9/1423 |
| 2018/0065806 A1* | 3/2018 | Sugahara | B25J 9/04 |
| 2019/0150375 A1* | 5/2019 | Miyahara | A01G 9/24 |
| 2019/0246571 A1 | 8/2019 | Ingram-Tedd et al. | |
| 2020/0236883 A1* | 7/2020 | Ambrosi | A01G 9/143 |
| 2021/0137028 A1* | 5/2021 | Zelkind | B65G 1/137 |
| 2021/0144930 A1* | 5/2021 | Breza | A01G 9/022 |
| 2021/0259170 A1* | 8/2021 | Marder-Eppstein | A01G 9/26 |

FOREIGN PATENT DOCUMENTS

| | | | | |
|---|---|---|---|---|
| JP | H09 308377 A | 12/1997 | | |
| WO | WO-2019030606 A1 * | 2/2019 | | A01G 31/06 |
| WO | WO-2019233536 A1 * | 12/2019 | | A01G 9/088 |
| WO | 2021/037901 A1 | 3/2021 | | |
| WO | WO-2021116115 A1 * | 6/2021 | | A01G 31/00 |

* cited by examiner

GREENHOUSE SYSTEM

CROSS-REFERENCE TO RELATED APPLICATION

The present application claims priority under 35 U.S.C. § 119(a) of Europe Patent Application No. 211 64 921.5 filed Mar. 25, 2021, the disclosure of which is expressly incorporated by reference herein in its entirety.

BACKGROUND

1. Field of the Invention

The invention relates to a method for operating a greenhouse system with a block storage, at least one block storage element and at least one vehicle.

The invention further relates to a greenhouse system with a block storage, at least one block storage element and at least one vehicle, wherein at least one block storage element can be temporarily accommodated in the block storage.

2. Discussion of Background Information

A block storage or a block storage system describes a storage system with at least one block storage element receiving room. Stackable block storage elements can be stored in and retrieved from the block storage element receiving room. For this purpose, the block storage element is stored in or retrieved from the block storage element receiving room through a loading room. The loading room can be arranged above or below the block storage element receiving room in the direction of gravity, so that a storage or retrieval direction is oriented in the direction of gravity or against the direction of gravity. If the loading room is arranged above the block storage element receiving room, the storage direction is oriented in the direction of gravity, and the retrieval direction against the direction of gravity. If the loading room is arranged below the block storage element receiving room in the direction of gravity, the storage direction is oriented against the direction of gravity, and the retrieval direction in the direction of gravity. If several block storage elements are stored in the block storage element receiving room, a block storage element stack comes about. Additional designations for the block storage are stack storage or container stack storage. In the following explanation, the block storage element receiving room is arranged above the loading room in the direction of gravity.

Plants are grown within the framework of a greenhouse system. To this end, the plants or seedlings require a corresponding environment with a suitable nutrient supply, lighting, or the like.

SUMMARY

The object of the present invention is to give the greenhouse system an efficient design.

This object is achieved by the features of claim 1.

Each block storage element here has a carrier frame and a plant receptacle, wherein the plant receptacle is detachably engaged with the carrier frame, wherein the block storage has at least one first zone and one second zone, and at least one first carrier frame and at least one second carrier frame, wherein the plant receptacle in the first zone is detachably engaged with the first carrier frame, and the plant receptacle is subsequently transferred into the second zone, wherein the plant receptacle is transferred from the first carrier frame to the second carrier frame within the framework of transferal from the first zone into the second zone, wherein the plant receptacle in the second zone is detachably engaged with the second carrier frame.

For example, the first carrier frame and the second carrier frame here differ in terms of their features, shape, or the like. Furthermore, for example, different circumstances prevail in the first zone and in the second zone, e.g., a $CO_2$ concentration, humidity, or the like.

This enables an adjustment of the respective circumstances to a growth stage of the stored plants, so that a good efficiency is present.

It is preferable that a plant receptacle stocked with seedlings and/or plants be illuminated in the first zone during a first growth phase by a first lighting system of a first carrier frame arranged above in the direction of gravity and/or that a plant receptacle having plants be illuminated in the second zone during a second growth phase by a second lighting system of a second carrier frame arranged above in the direction of gravity. For example, seedlings also comprise newly sown seeds for germination or the like. The lighting system adjusted to the growth phase enables an energy savings, since seedlings and/or small plants in a first growth phase require no lighting or only a lower lighting intensity than plants in a later growth phase, for example. Furthermore, this makes it possible to adjust the conditions, in particular the lighting, to the growth phase, so that the seedlings and/or plants encounter optimal growth conditions. As a consequence, the seedlings and/or plants grow quickly. This results in an elevated good throughput for the greenhouse system.

The plant receptacle is preferably stocked with seedlings and/or plants at a stocking site outside of the block storage, and subsequently engaged with the first carrier frame and stored in the first zone of the block storage. Outside of the block storage, the seedlings and/or plants can be transferred into the plant receptacle manually by people and/or automatically by robots, for example. By separating the stocking process from the actual storage within the block storage, a corresponding atmosphere can be maintained within the block storage. In addition, separating the stocking process, in terms of planting the plants, from storage prevents the plants and/or seedlings located in the block storage from becoming contaminated by people, thereby avoiding disruptions in the operating process.

Within the framework of a transferal from the first carrier frame to the second carrier frame, the plant receptacle is relocated to a relocation site. As soon as the plants and/or seedlings have reached a certain size, the complete plant receptacle is transferred from the first carrier frame to the second carrier frame. The first carrier frame is here adjusted to the first growth phase, and the second carrier frame is adjusted to the second growth phase. Accordingly, for example, an expansion in the direction of gravity of the first carrier frame is smaller than an expansion of the second carrier frame in the direction of gravity. The relocation addresses the needs of the plants in a respective growth phase, so that the plants thrive. Accordingly, more first carrier frames than second carrier frames can be arranged in a room with a defined expansion m the direction of gravity.

The carrier frame with the plant receptacle with harvestable plants is preferably transferred to a retrieval site, wherein the plant receptacle is separated from the carrier frame at the retrieval site. Separating the plant receptacle from the carrier frame, here the second carrier frame, makes the plant receptacle readily accessible, so that harvesting by people and/or robots can take place, for example. This enables an efficient harvesting of the plants.

The plant receptacle is preferably transferred proceeding from the retrieval site to the stocking site, wherein the plant receptacle is cleaned on the way from the retrieval site to the stocking site. The cleaning process eliminates all contamination to the plant receptacle, so that the seedlings and/or plants to be stocked encounter a clean plant receptacle, which keeps down the danger of mold formation, the emergence of pests, or the like.

For example, the carrier frame can be guided to the relocation site, wherein the carrier frame can here be serviced or cleaned, for example. This increases the life of the carrier frames.

For example, the plant receptacle is here transferred outside of the block storage from the retrieval site to the stocking site, wherein the plant receptacle is also cleaned outside of the block storage.

The greenhouse system preferably has a first buffer and a second buffer, wherein first carrier frames with an unloaded plant receptacle or without the plant receptacle are removably stocked in the first buffer, and second carrier frames with an unloaded plant receptacle or without the plant receptacle are removably stocked in the second buffer. This creates buffer capacities, thereby ensuring a trouble-free operation of the greenhouse system, For example, the first buffer can be integrated into the second buffer. This keeps down the space required.

In addition, the object is achieved by the features of claim 8.

To this end, the block storage element has a carrier frame and a plant receptacle detachably engaged with the carrier frame, wherein the block storage has at least one first zone and one second zone, wherein a first carrier frame forms a first block storage element with the plant receptacle, and a second carrier frame forms a second block storage element with the plant receptacle, wherein the first block storage element can be stocked in the first zone, and the second block storage element can be stocked in the second zone, wherein the plant receptacle can be transferred from the first carrier frame to the second carrier frame.

As a result of this arrangement, the carrier frames can be handled separately from the plant receptacle. This eliminates the need to "repot" the seedlings and/or plants between a stay in the first zone and harvesting. This reduces the stress on the plants and/or seedlings during their growth, so that the plants and/or seedlings can grow undisturbed without having to generate new root systems.

Seedlings and/or plants, also referred to as plants, in this application denote all growth stages of a plant, from a seed or the like up to a harvestable plant.

The first zone is here adjusted to a first growth phase of the plant, so that the plant encounters optimal growth conditions within this first growth phase. For example, the second zone is adjusted to a second growth phase of the plant, so that the plant encounters optimal growth conditions within the second growth phase. As a result, the plants grow quickly, so that a high throughput is achieved for the block storage and greenhouse system.

The first carrier frame preferably has a first lighting system and/or the second carrier frame has a second lighting system. These lighting systems allow the plants to be illuminated according to their growth phase, for example so that one plant is illuminated with a lower intensity in the first growth phase than in the second growth phase. Adjusting the lighting system to the respective growth phase enables a good growth of the plants.

An expansion of the first carrier frame in the direction of gravity is preferably smaller than an expansion of the second carrier frame in the direction of gravity. As a result, more first carrier frames than second carrier frames can be stocked in a block storage element receiving room with a defined vertical expansion. Therefore, the first zone can be smaller in design than the second zone. This keeps down the space required.

The greenhouse system preferably has a stocking site, a retrieval site, and a relocation site. For example, plants can be transferred to the plant receptacle at the stocking site. The plant receptacle is then engaged with the first carrier frame. At the relocation site, the plant receptacle is transferred from a first carrier frame to a second carrier frame, for example. At the retrieval site, the carrier frame and plant receptacle are detached from each other, wherein harvesting further takes place at the retrieval site, for example. At the respective site, stocking site, retrieval site or relocation site, for example, a peripheral can be adjusted to the task of the respective site. A good efficiency is achieved as a result.

It is preferable that the stocking site and/or the retrieval site comprise the relocation site, and/or that the stocking site comprise the retrieval site. This arrangement makes it possible to perform several tasks, for example stocking, relocation and retrieval or harvesting, at one location. As a result, the space required is further reduced, so that the greenhouse system is compact.

A transfer system is preferably provided between the retrieval site and the stocking site. For example, the transfer [system] transfers a plant receptacle. As a result, the plant receptacle can be transferred from the retrieval site proceeding to the stocking site, so that enough plant receptacles are available at the retrieval site. This enables an efficient operation.

The transfer system preferably has a cleaning device. For example, the cleaning device here cleans the plant receptacle. As a result, plants can be placed in a clean plant receptacle. This reduces the germ load, so that subsequently possible operating failures or crop failures are avoided.

The block storage preferably has a first buffer for accommodating at least one first carrier frame, and a second buffer for accommodating at least one second transport carrier transport frame. The buffers can always provide enough carrier frames, thereby enabling a smooth operating process. For example, the first buffer can here be integrated into the second buffer. This leads to a compact greenhouse system

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
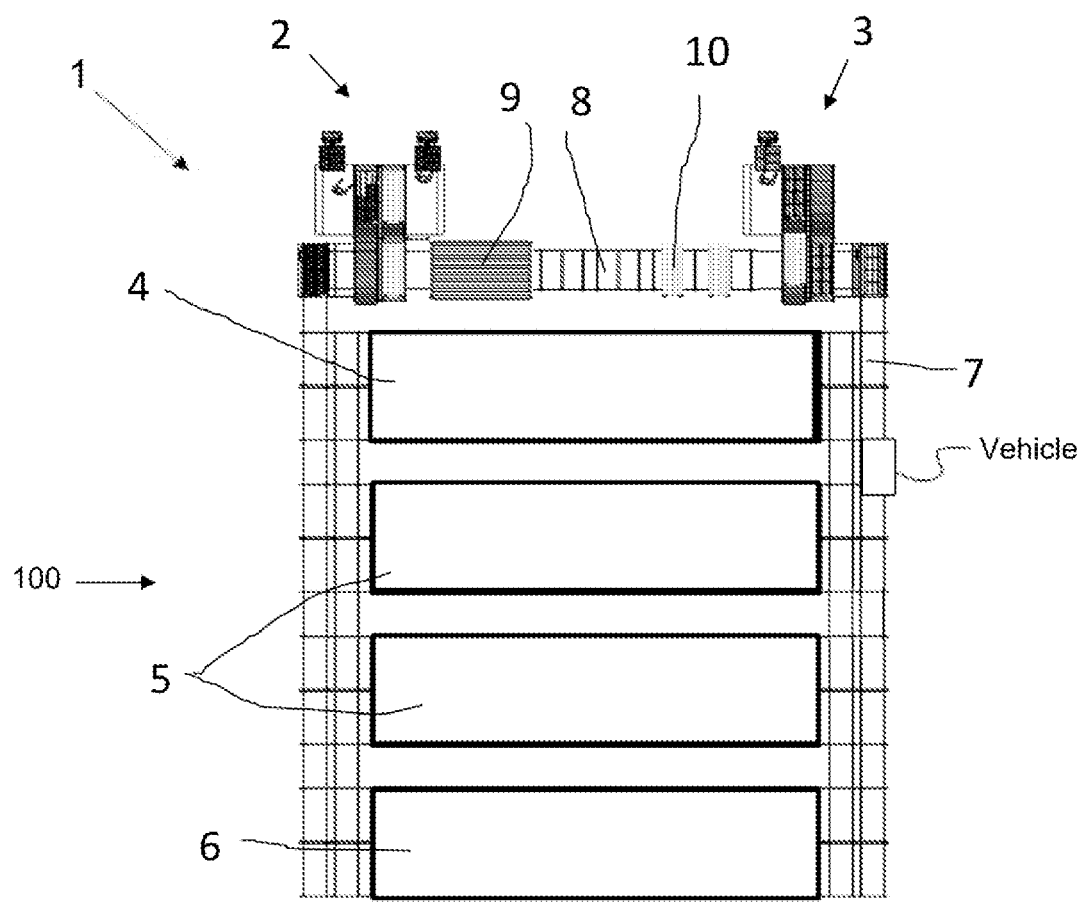
FIG. 1 is a top view of a greenhouse system.

FIG. 1 shows a greenhouse system 1 with a retrieval site 2, a stocking/relocation site 3, a first zone 4, a second zone 5, a buffer 6, traversing paths 7 for a vehicle, a transfer system 8, a cleaning device 9 and a plant receptacle 10, which is at times engaged with a carrier frame 102. The first zone 4, the second zone 5, the buffer 6 as well as part of the traversing paths 7 are arranged within a block storage 100.

The first zone 4, the second zone 5 and the buffer have block storage element receiving rooms 110, into which block storage elements (see below) are stocked and retrieved through a loading room 111 from below in the direction of gravity.

Figure 2:
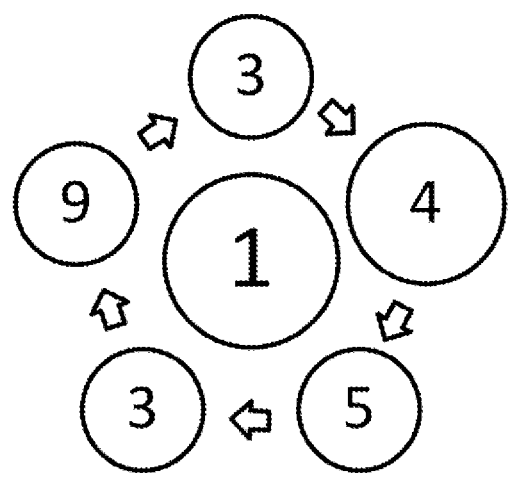
FIG. 2 is a schematic illustration of a sequence for operating the greenhouse system.
Figure 3:
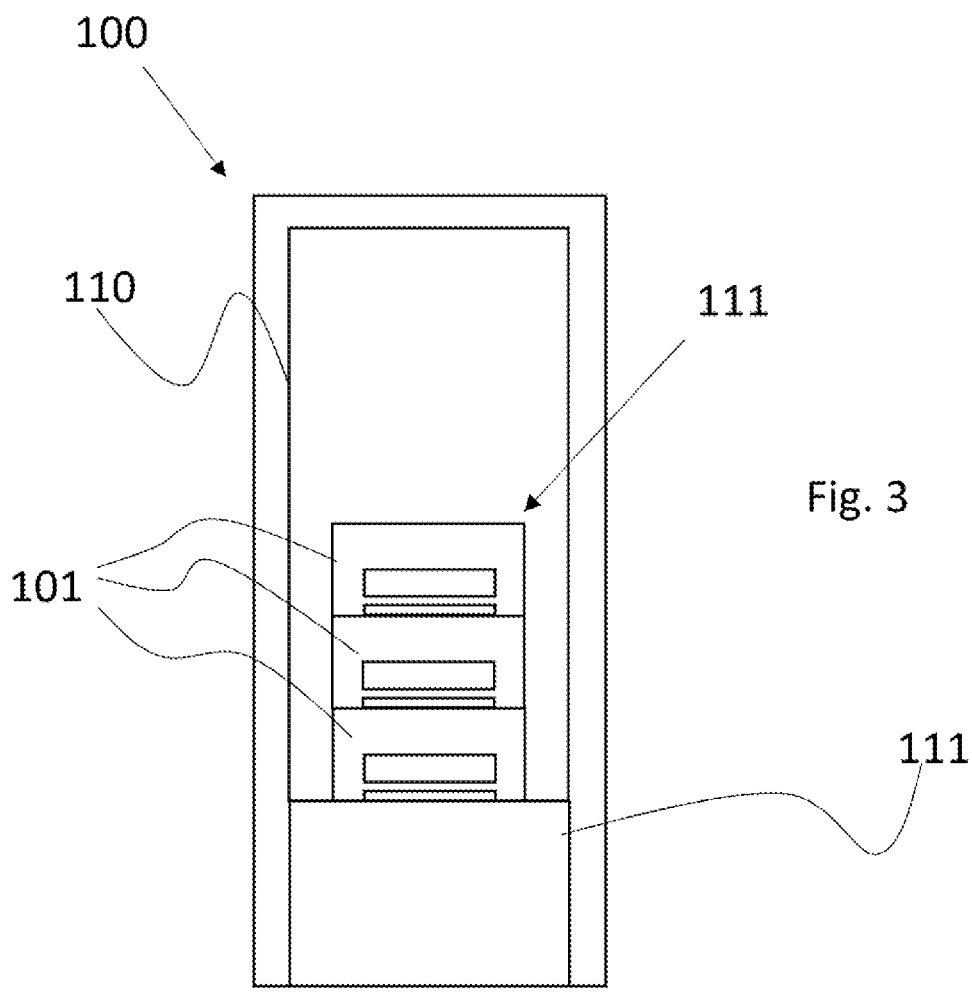

The sequence of a cycle during operation of the greenhouse system 1 will be shown below based upon FIG. 2. A plant receptacle 10 is seeded at the stocking/relocation site 3. The seeded plant receptacle 10 is further engaged with a first carrier frame 103 at the stocking/retrieval site. The plant receptacle 10 and the first carrier frame together form a first block storage element 101.

The first block storage element is transferred into the first zone, or into a block storage element receiving room in the first zone.

The first block storage element remains in the first zone 4 for a defined period until the seeds have reached a defined growth stage.

Figure 4:
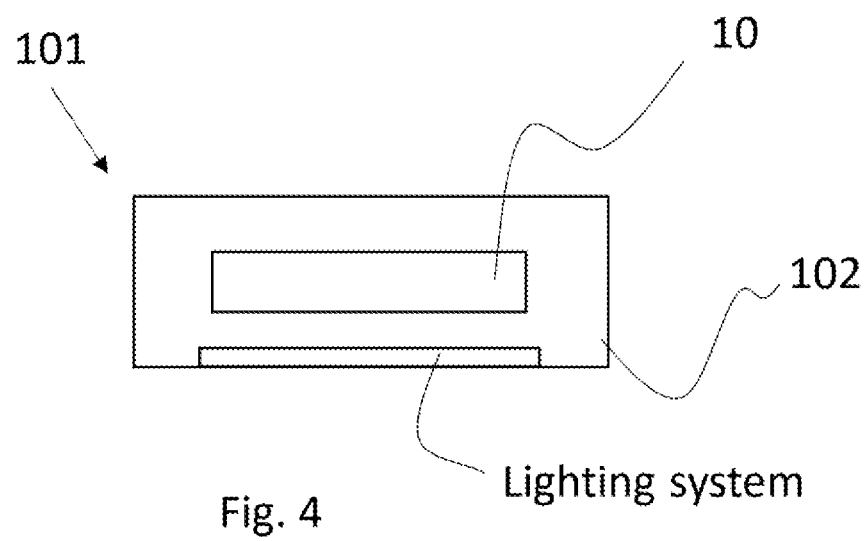
Figure 5:
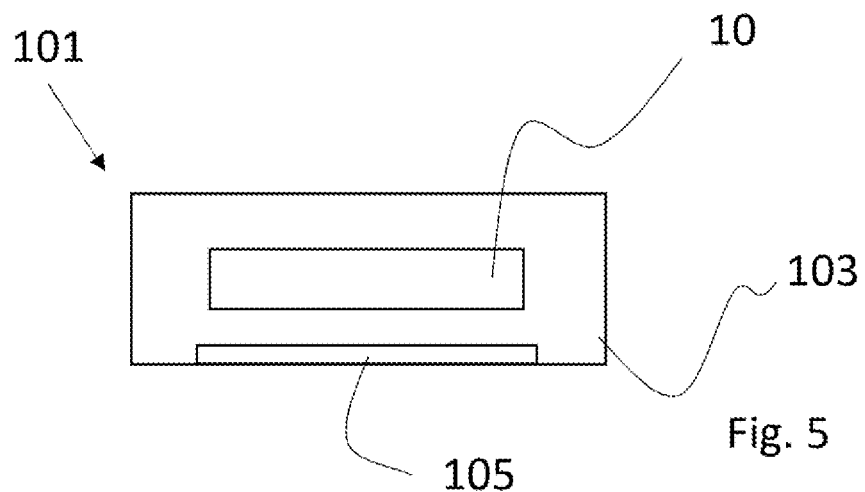
Figure 6:
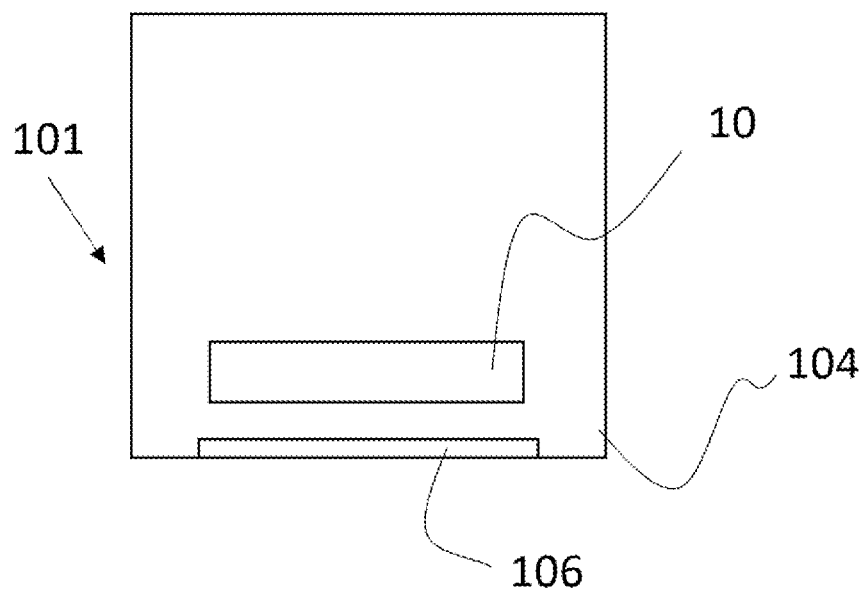

In order for the seeds to encounter an optimal growth environment, the atmosphere within the first zone can be adjusted. The lighting conditions are here realized by way of lighting systems (see FIG. 4, for example) on the carrier frame. Depending on the plant type, seeds prefer a light-intensive or rather darker environment for germinating, Based on the preferences, the first carrier frame can be outfitted with corresponding lighting systems. In addition, seeds and their seedlings are smaller than plants in subsequent growth phases. Accordingly, the first carrier frame has an expansion measured in the direction of gravity that is adjusted to the first growth phase.

After a certain time, the seedlings that arose from the seeds require a different environment as well as different space conditions. To this end, the complete first block storage element complete with first carrier frame and plant receptacle 10 is transferred out of the first zone 4 to the stocking/relocation site 3. At the stocking/relocation site 3, the plant receptacle 10 is separated from the first carrier frame. The first carrier frame is then transferred into the buffer 6, for example. The plant receptacle 10 is engaged with a second carrier frame, so that the second carrier frame forms a second block storage element with the plant receptacle 10. For example, the second carrier frame is here removed from the buffer.

The second block storage element is then transferred from the vehicle into the second zone 5, wherein the second block storage element is stocked in a block storage element receiving room of the second zone. In the second zone, the atmosphere and lighting are adjusted to the growth stage and corresponding requirements of the plant.

The second carrier frame is likewise adjusted to the required conditions of the plant. The second carrier frame enables a larger expansion in the direction of gravity of the plant. In addition, plants in later growth phases require more light, so that the second carrier frame has a different lighting system. The lighting system is here arranged in such a way as to radiate downwardly in the direction of gravity. In a block storage element stack, one block storage element, in particular the plant receptacle 10, is irradiated from above.

The process of relocating from one zone 4, 5 to another zone 5, 4 and the associated relocation of the plant receptacle 10 from one carrier frame into another carrier frame can be repeated according to the needs of the plant. Each zone and each carrier frame can here be adjusted to the needs of the plant in a corresponding growth stage.

As soon as the plants have reached a harvestable stage, they along with the plant receptacle 10 and the carrier frame, here for example the second carrier frame, are transferred as a second block storage element out of the second zone to the retrieval site 2 by the vehicle.

At the retrieval site 2, the plant receptacle 10 is separated from the second carrier frame, wherein the second carrier frame is subsequently transferred into the buffer 6, for example. The buffer 6 can here also be arranged in the first zone 4 and/or in the second zone 5, for example, wherein plants with varying growth progress are stocked in the first zone 4 and the second zone 5.

The harvestable plants of the plant receptacle 10 are harvested. The plant receptacle 10 is subsequently transferred by the transfer system 8 to the cleaning device 9, wherein the cleaning device 9 cleans and/or disinfects the plant receptacle 10. The plant receptacle 10 is subsequently brought to the stocking/relocation site 3, where it is again loaded with seeds or seedlings. The transfer system 8 here serves to provide the plant receptacles 10. The transfer system 8 thus also has a buffer function.

The carrier frames are here exclusively moved by the vehicle. In addition, the vehicle can separate the carrier frames from the plant receptacle 10, so that the plant receptacles can be removed from the carrier frame at the stocking/relocation site 3 and/or retrieval site 2. In addition, several vehicles can be provided.

For example, complete block storage element stacks are always stocked, relocated, or retrieved. The complete block storage element stack relates to the maximum storage capacity of a block storage element receiving room. Proceeding from the vehicle, the block storage elements are here individually transferred from a block storage element receiving room into another block storage element receiving room. As a consequence, a fixed time period of the growth phase for the plants is allocated to each block storage element receiving room, for example. For example, a first block storage element receiving room is allocated to the first day of the growth phase, a second block storage element receiving room to a second day of the growth phase, etc. The number of block storage element receiving rooms is defined according to the time period of the growth phase.

As shown, zones 4, 5 are spatially separated from each other. However, they can also adjoin each other.

LIST OF REFERENCE NUMERALS

1 Greenhouse system
2 Retrieval site
3 Stocking/relocation site
4 First zone
5 Second zone
6 Buffer
7 Traversing path
8 Transfer system
9 Cleaning device
10 Plant receptacle

What is claimed:

1. A method for operating a greenhouse system with a block storage, at least one stackable block storage element and at least one vehicle,
  wherein the stackable block storage element is stored in or retrieved from a block storage element receiving room through a loading room by means of a vehicle,
  wherein the loading room is arranged below the block storage element receiving room in a direction of gravity,
  wherein several block storage elements being stored in the block storage element receiving room form a block storage element stack,
  wherein each block storage element includes a carrier frame and a plant receptacle, with the plant receptacle being detachably engagable with the carrier frame, and
  wherein the block storage has at least one first zone and one second zone, and at least one first carrier frame and at least uric second carrier frame;
  said method comprising:
    detachably engaging the plant receptacle of the first zone with the first carrier frame, and, subsequently, transferring the plant receptacle into the second zone,
      said transferring the plant receptacle from the first zone into the second zone comprising:
        transferring the plant receptacle from the first carrier frame to the second carrier frame, and
  wherein the plant receptacle in the second zone is detachably engaged with the second carrier frame.

2. The method according to claim 1, further comprising:
  illuminating a plant receptacle stocked with seedlings and/or plants in the first zone during a first growth phase by a first lighting system of the first carrier frame arranged above in a direction of gravity and/or illuminating a plant receptacle having plants in the second zone during a second growth phase by a second lighting system of the second carrier frame arranged above in a direction of gravity.

3. The method according to claim 1, wherein:
  the plant receptacle is stocked with seedlings and/or plants at a stocking site outside of the block storage, and subsequently engaged with the first carrier frame and stored in the first zone of the block storage.

4. The method according to claim 1, wherein:
  as part of a transferal from the first carrier frame to the second carrier frame, the plant receptacle is relocated to a relocation site.

5. The method according to claim 1, further comprising:
  transferring a carrier frame having a plant receptacle with harvestable plants to a retrieval site,
  the plant receptacle is separated from the carrier frame at the retrieval site.

6. The method according to claim 5, further comprising
  transferring a plant receptacle proceeding from the retrieval site to a stocking site, and
  cleaning a plant receptacle on the way from the retrieval site to the stocking site.

7. The method according to claim 1, further comprising:
  the greenhouse system has a first buffer and a second buffer,
  removably stocking first carrier frames with an unloaded plant receptacle or without the plant receptacle in the first buffer, and
  removably stocking second carrier frames with an unloaded plant receptacle or without the plant receptacle in the second buffer.

8. A greenhouse system comprising:
  a block storage, at least one block storage element, and at least one vehicle,
  wherein the stackable block storage element is stored in or retrieved from a block storage element receiving room through a loading room by means of a vehicle,
  wherein the loading room is arranged below the block storage element receiving room in a direction of gravity,
  wherein several block storage elements being stored in the block storage element receiving room form a block storage element stack,
  wherein at least one block storage element is configured to be stored in the block storage,
  wherein the block storage element has a carrier frame and a plant receptacle detachably engaged with the carrier frame,
  wherein the block storage comprises at least one first zone and one second zone,
  wherein a first carrier frame forms a first block storage element with the plant receptacle, and a second carrier frame forms a second block storage element with the plant receptacle,
  wherein the first block storage element is configured to be stocked in the first zone, and the second block storage element is configured to be stocked in the second zone,
  wherein the plant receptacle is configured to be transferred from the first carrier frame to the second carrier frame.

9. The greenhouse system according to claim 8, wherein:
  the first carrier frame has a first lighting system and/or the second carrier frame has a second lighting system.

10. The greenhouse system according to claim 8, wherein:
  an expansion of the first carrier frame in the direction of gravity is smaller than an expansion of the second carrier frame in a direction of gravity.

11. The greenhouse system according to claim 8, wherein:
  the greenhouse system has a stocking site, a retrieval site and a relocation site.

12. The greenhouse system according to claim 11, wherein:
  the stocking site and/or the retrieval site comprises the relocation site, and/or the stocking site comprises the retrieval site.

13. The greenhouse system according to claim 11, wherein:
  a transfer system is provided between the retrieval site and the stocking site.

14. The greenhouse system according to claim 11, wherein:
  the transfer system has a cleaning device.

15. The greenhouse system according to claim 8, wherein:
  the greenhouse system has a first buffer for accommodating at least one first carrier frame, and a second buffer for accommodating at least one second carrier frame.

* * * * *